United States Patent
Li

(10) Patent No.: US 8,164,477 B2
(45) Date of Patent: Apr. 24, 2012

(54) JOINT CHANNEL CODING AND MODULATION FOR IMPROVED PERFORMANCE OF TELEMETRY SYSTEMS

(75) Inventor: Jiang Li, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 922 days.

(21) Appl. No.: 12/190,430

(22) Filed: Aug. 12, 2008

(65) Prior Publication Data

US 2010/0039287 A1 Feb. 18, 2010

(51) Int. Cl.
*G01V 3/00* (2006.01)
*E21B 47/12* (2012.01)

(52) U.S. Cl. ........ 340/855.7; 175/40

(58) Field of Classification Search ........ 340/855.5, 340/855.7; 175/40
See application file for complete search history.

(56) References Cited

U.S. PATENT DOCUMENTS

| | | | | |
|---|---|---|---|---|
| 3,790,930 A | * | 2/1974 | Lamel et al. | 367/82 |
| 4,087,781 A | * | 5/1978 | Grossi et al. | 340/853.7 |
| 4,302,757 A | * | 11/1981 | Still | 340/854.4 |
| 4,352,166 A | * | 9/1982 | Schoonover | 367/69 |
| 4,739,325 A | * | 4/1988 | MacLeod | 340/854.4 |
| 4,839,644 A | * | 6/1989 | Safinya et al. | 340/854.3 |
| 5,689,248 A | * | 11/1997 | Esfahani et al. | 340/853.1 |
| 6,626,253 B2 | | 9/2003 | Hahn et al. | |
| 6,741,185 B2 | * | 5/2004 | Shi et al. | 340/853.2 |
| 6,898,149 B2 | * | 5/2005 | Hill et al. | 367/82 |
| 7,026,951 B2 | * | 4/2006 | Bailey et al. | 340/854.3 |

OTHER PUBLICATIONS

Jiang Li; "Unequal Error Protection for Reliable Data Transmission over Telemetry Channels," Strategic Technology and Advanced Research, Aug. 2, 2007, pp. 21.
A. J. Viterbi; "Error Bounds for Convolutional Codes and an Asymptotically Optimum Decoding Algorithm," IEEE Transaction of Information Theory, Apr. 1967.
G. Ungerboeck; "Trellis-Coded Modulation with Redundant Signal Sets Part II: State of the Art," IEEE Communications Magazine, vol. 25, No. 2, Feb. 1987, pp. 12-21.
D. Saha; Channel Coding with Quadrature-Quadrature Phase Shift-Keying (Q2PSK) signals, IEEE Transactions on Communications, vol. 38, No. 4, Apr. 1990, pp. 409-416.
Jiang Li; "An Investigation on Quaternary PSK and FSK Communication Schemes for Mud Pulse Telemetry," Strategic Technology Development, Dec. 9, 2005, pp. 1-16.

* cited by examiner

*Primary Examiner* — Kenneth L Thompson
(74) *Attorney, Agent, or Firm* — Mossman Kumar & Tyler PC

(57) ABSTRACT

Jointly designed channel coding and modulation are used in an uplink telemetry system for transmitting a message signal from a bottomhole location to a surface location. A constant envelope quadrature-quadrature phase-shift keying may be used.

21 Claims, 8 Drawing Sheets

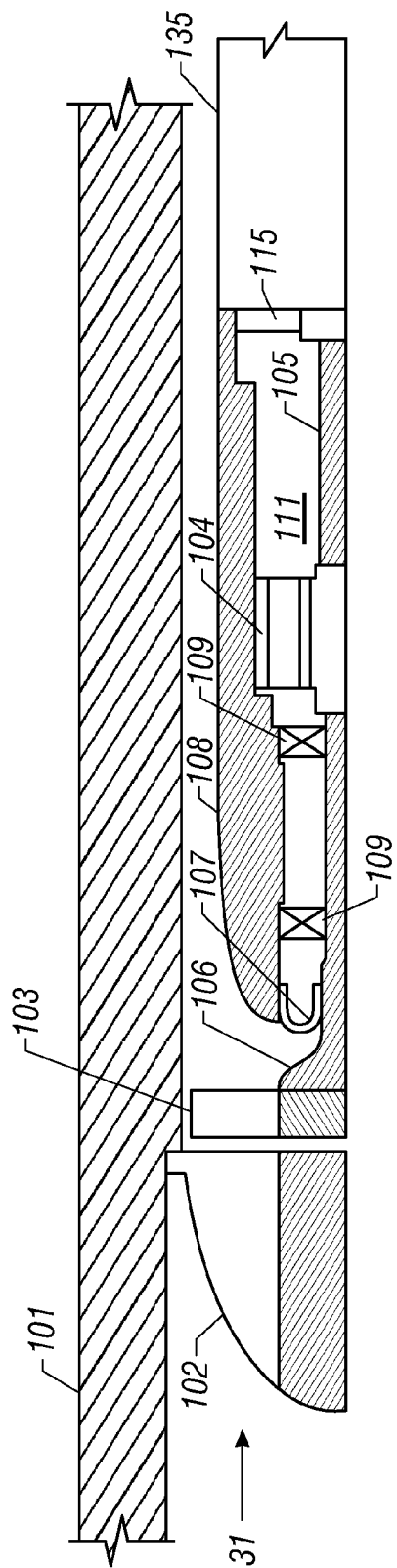
FIG. 2A
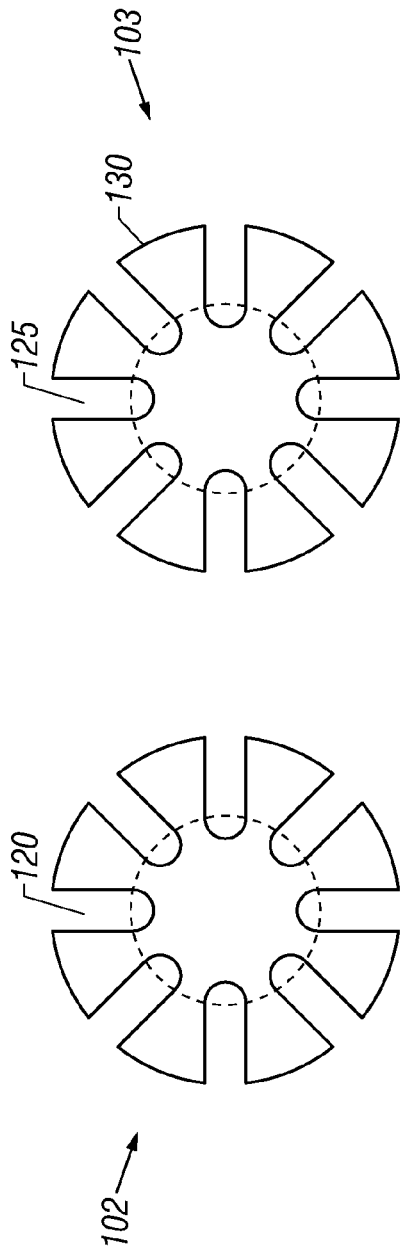
FIG. 2B
FIG. 2C

JOINT CHANNEL CODING AND MODULATION FOR IMPROVED PERFORMANCE OF TELEMETRY SYSTEMS

BACKGROUND OF THE DISCLOSURE

1. Field of the Disclosure

The present disclosure relates to telemetry systems for communicating information from a downhole location to a surface location, and, more particularly, to a method of increasing the data rate of transmitted signals.

2. Description of the Related Art

Drilling fluid telemetry systems, generally referred to as mud pulse systems, are particularly adapted for telemetry of information from the bottom of a borehole to the surface of the earth during oil well drilling operations. The information telemetered often includes, but is not limited to, parameters of pressure, temperature, direction and deviation of the borehole. Other parameters include logging data such as resistivity of the various layers, sonic density, porosity, induction, self potential and pressure gradients. This information is important to efficiency in the drilling operation.

Measurement-while-drilling (MWD) Telemetry is required to link the downhole MWD components to the surface MWD components in real-time, and to handle most drilling related operations without breaking stride. The system to support this is quite complex, with both downhole and surface components that operate in step.

In any telemetry system there is a transmitter and a receiver. In MWD Telemetry the transmitter and receiver technologies are often different if information is being up-linked or down-linked. In up-linking, the transmitter is commonly referred to as the Mud-Pulser (or more simply the Pulser) and is an MWD tool in the BHA that can generate pressure fluctuations in the mud stream. The surface receiver system includes sensors that measure the pressure fluctuations and/or flow fluctuations, and signal processing modules that interpret these measurements.

Down-linking may be achieved by either periodically varying the flow-rate of the mud in the system or by periodically varying the rotation rate of the drillstring. In the first case, the flow rate is controlled using a bypass-actuator and controller, and the signal is received in the downhole MWD system using a sensor that is affected by either flow or pressure. In the second case, the surface rotary speed is controlled manually, and the signal is received using a sensor that is affected.

For uplink telemetry, a suitable pulser is described in U.S. Pat. No. 6,626,253 to Hahn et al., having the same assignee as the present application and the contents of which are fully incorporated herein by reference. Described in Hahn is an anti-plugging oscillating shear valve system for generating pressure fluctuations in a flowing drilling fluid. The system includes a stationary stator and an oscillating rotor, both with axial flow passages. The rotor oscillates in close proximity to the stator, at least partially blocking the flow through the stator and generating oscillating pressure pulses. The rotor passes through two zero speed positions during each cycle, facilitating rapid changes in signal phase, frequency, and/or amplitude facilitating enhanced data encoding.

Drilling systems (described below) include mud pumps for conveying drilling fluid into the drillstring and the borehole. Pressure waves from surface mud pumps produce considerable amounts of noise. The pump noise is the result of the motion of the mud pump pistons. The pump noise and other noises interfere with the uplink telemetry signal. Much of the prior art on improving the telemetry system has been directed towards filtering of the received signals to reduce the effects of noise. See, for examples, U.S. patent application Ser. No. 11/855,686 of Reckmann, U.S. patent application Ser. No. 11/837,213 of Hentati, U.S. patent application Ser. No. 11/674,866 of Wassermann et al., U.S. patent application Ser. No. 11/674,988 of Li et al., and U.S. patent application Ser. No. 11/675,025 of Reckmann et al., all having the same assignee as the present disclosure. Little effort has been directed towards increasing the data rate while, at the same time, reducing the error rate in the reconstruction of the telemetered signals. The present disclosure addresses this problem.

SUMMARY OF THE DISCLOSURE

One embodiment of the disclosure is a method of communicating a message signal in a borehole between a downhole location and a surface location. The method includes acquiring the message signal to be transmitted uphole, selecting a data rate and a carrier frequency of a signal used to communicate the message signal, encoding and modulating the message signal using an encoding scheme including a set partitioning to produce an encoded modulated signal, using the encoded modulated signal to generate a signal at the downhole location, receiving a signal at the surface location responsive to the generated signal, and demodulating and decoding the received signal to provide an estimate of the message signal.

Another embodiment of the disclosure is a system for communicating a message signal in a borehole between a downhole location and a surface location. The system includes a sensor configured to acquire data forming a message signal to be transmitted uphole; at least one downhole processor configured to use a selected data rate and a selected carrier frequency of a carrier signal to encode and modulate the message signal using an encoding scheme including a set partitioning to produce an encoded modulated signal; a signal generator configured to generate a signal at the downhole location responsive to the encoded modulation signal; a receiver at the surface location configured to produce an output signal responsive to the generated signal; and at least one surface processor configured to demodulate and decode the output signal of the receiver to provide an estimate of the message signal.

Another embodiment of the disclosure is a computer-readable medium accessible to at least one processor. The computer-readable medium includes instructions which enable the at least one processor to demodulate and decode an output signal from a surface receiver responsive to a generated signal downhole, wherein the generated signal comprises a carrier signal encoded and modulated using a set partitioning of a message signal based on data acquired by a downhole sensor.

BRIEF DESCRIPTION OF THE DRAWINGS

For detailed understanding of the present disclosure, references should be made to the following detailed description of one embodiment, taken in conjunction with the accompanying drawings, in which like elements have been given like numerals and wherein:

FIG. 2A (prior art) is a schematic view of a pulser assembly for mud pulse telemetry;

FIG. 2B (prior art) shows a stator of the pulser assembly of FIG. 2A;

FIG. 2C (prior art) shows a rotor of the pulser assembly of FIG. 2A;

DETAILED DESCRIPTION OF THE DISCLOSURE

Figure 1:
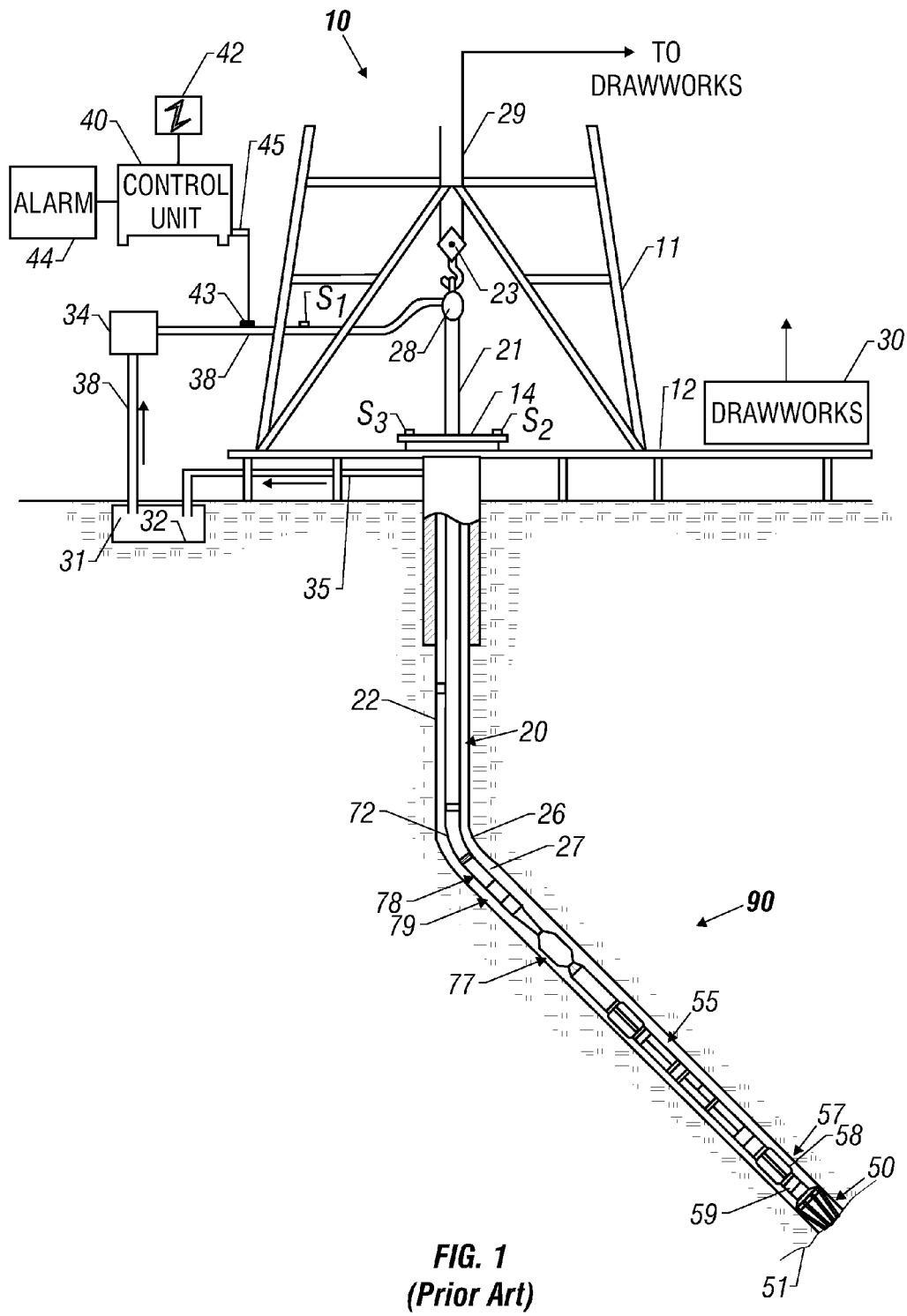
FIG. 1 shows a schematic diagram of a drilling system with a drillstring carrying a drilling assembly conveyed in a borehole for drilling the borehole.

FIG. 1 shows a schematic diagram of a drilling system 10 with a drillstring 20 carrying a drilling assembly 90 (also referred to as the bottom hole assembly, or "BHA") conveyed in a "borehole" or "borehole" 26 for drilling the borehole. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the borehole 26 when a drill pipe 22 is used as the tubing. For coiled-tubing applications, a tubing injector, such as an injector (not shown), however, is used to move the tubing from a source thereof, such as a reel (not shown), to the borehole 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. The telemetry method is discussed further below. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur. The system also includes a downhole processor, a sensor assembly for making formation evaluation measurements, and an orientation sensor. These may be located at any suitable position on the bottomhole assembly (BHA). The downhole processor encodes the measurements made by the formation evaluation sensors and by the other sensor that provide measurements of drilling conditions, and encodes the measurements for transmission by the telemetry sub 72.

FIG. 2A is a schematic view of the pulser, also called an oscillating shear valve, assembly 19, for mud pulse telemetry. The pulser assembly 19 is located in the inner bore of the tool housing 101. The housing 101 may be a bored drill collar in the bottom hole assembly 10, or, alternatively, a separate housing adapted to fit into a drill collar bore. The drilling fluid 31 flows through the stator 102 and rotor 103 and passes through the annulus between the pulser housing 108 and the inner diameter of the tool housing 101.

The stator 102, see FIGS. 2A and 2B, is fixed with respect to the tool housing 101 and to the pulser housing 108 and has multiple lengthwise flow passages 120. The rotor 103, see FIGS. 2A and 2C, is disk shaped with notched blades 130 creating flow passages 125 similar in size and shape to the flow passages 120 in the stator 102. Alternatively, the flow passages 120 and 125 may be holes through the stator 102 and the rotor 103, respectively. The rotor passages 125 are adapted such that they can be aligned, at one angular position with the stator passages 120 to create a straight through flow path. The rotor 103 is positioned in close proximity to the stator 102 and is adapted to rotationally oscillate. An angular displacement of the rotor 103 with respect to the stator 102 changes the effective flow area creating pressure fluctuations in the circulated mud column. To achieve one pressure cycle it is necessary to open and close the flow channel by changing the angular positioning of the rotor blades 130 with respect to the stator flow passage 120. This can be done with an oscillating movement of the rotor 103. Rotor blades 130 are rotated in a first direction until the flow area is fully or partly restricted. This creates a pressure increase. They are then rotated in the opposite direction to open the flow path again. This creates a pressure decrease. The required angular displacement depends on the design of the rotor 103 and stator 102. The more flow paths the rotor 103 incorporates, the less the angular displacement required to create a pressure fluctuation is. A small actuation angle to create the pressure drop is desirable. The power required to accelerate the rotor 103 is proportional to the angular displacement. The lower the angular displacement is, the lower the required actuation power to accelerate or decelerate the rotor 103 is. As an example, with eight flow openings on the rotor 103 and on the stator 102, an angular displacement of approximately 22.5° is used to create the pressure drop. This keeps the actuation energy relatively small at high pulse frequencies. Note that it is not necessary to completely block the flow to create a pressure pulse and therefore different amounts of blockage, or angular rotation, create different pulse amplitudes.

The rotor 103 is attached to shaft 106. Shaft 106 passes through a flexible bellows 107 and fits through bearings 109 which fix the shaft in radial and axial location with respect to housing 108. The shaft is connected to a electrical motor 104, which may be a reversible brushless DC motor, a servomotor, or a stepper motor. The motor 104 is electronically controlled, by circuitry in the electronics module 135, to allow the rotor 103 to be precisely driven in either direction. The precise control of the rotor 103 position provides for specific shaping of the generated pressure pulse. Such motors are commercially available and are not discussed further. The electronics module 135 may contain a programmable processor which can be preprogrammed to transmit data utilizing any of a number of encoding schemes which include, but are not limited to, Amplitude Shift Keying (ASK), Frequency Shift Keying (FSK), or Phase Shift Keying (PSK) or a combination of these techniques. Specific encoding schemes are discussed below.

In one embodiment of the disclosure, the tool housing 101 has pressure sensors, not shown, mounted in locations above and below the pulser assembly, with the sensing surface exposed to the fluid in the drill string bore. These sensors are powered by the electronics module 135 and can be for receiving surface transmitted pressure pulses. The processor in the electronics module 135 may be programmed to alter the data encoding parameters based on surface transmitted pulses. The encoding parameters can include type of encoding scheme, baseline pulse amplitude, baseline frequency, or other parameters affecting the encoding of data.

The entire pulser housing 108 is filled with appropriate lubricant 111 to lubricate the bearings 109 and to pressure compensate the internal pulser housing 108 pressure with the downhole pressure of the drilling mud 31. The bearings 109 are typical anti-friction bearings known in the art and are not described further. In one embodiment, the seal 107 is a flexible bellows seal directly coupled to the shaft 106 and the pulser housing 108 and hermetically seals the oil filled pulser housing 108. The angular movement of the shaft 106 causes the flexible material of the bellows seal 107 to twist thereby accommodating the angular motion. The flexible bellows material may be an elastomeric material or, alternatively, a fiber reinforced elastomeric material. It is necessary to keep the angular rotation relatively small so that the bellows material will not be overstressed by the twisting motion. In an alternate embodiment, the seal 107 may be an elastomeric rotating shaft seal or a mechanical face seal.

In one embodiment, the motor 104 is adapted with a double ended shaft or alternatively a hollow shaft. One end of the motor shaft is attached to shaft 106 and the other end of the motor shaft is attached to torsion spring 105. The other end of torsion spring 105 is anchored to end cap 115. The torsion spring 105 along with the shaft 106 and the rotor 103 comprise a mechanical spring-mass system. The torsion spring 105 is designed such that this spring-mass system is at its natural frequency at, or near, the desired oscillating pulse frequency of the pulser. The methodology for designing a resonant torsion spring-mass system is well known in the mechanical arts and is not described here. The advantage of a resonant system is that once the system is at resonance, the motor only has to provide power to overcome external forces and system dampening, while the rotational inertia forces are balanced out by the resonating system.

Figure 3:
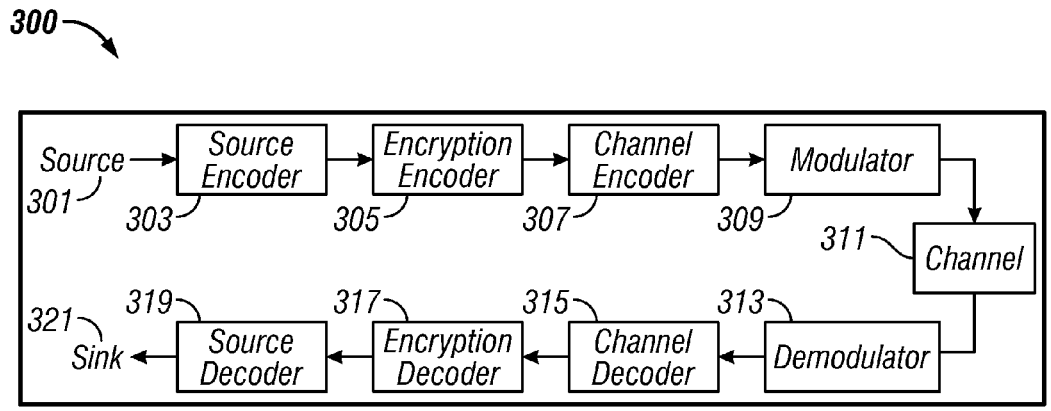
FIG. 3 shows a block diagram for a mud pulse digital communication system.

FIG. 3 shows a block diagram of a mud pulse digital communication system 300. The message signal to be telemetered uphole is indicated by 301. As noted above, this message signal may include formation evaluation measurements and measurements of the state of the drilling system. The source encoder 303 performs data compression by removing the redundancy among source data. The encryption encoder 305 scrambles the information to make unintended listeners unable to discern the information contents. Encryption would not be necessary in a mud pulse telemetry system where access to the communication channel (the fluid in the borehole) is limited. The channel encoder 307 adds redundancy into the information symbols in a controlled way so that the errors introduced during the channel transmission can be detected or corrected. The modulator 309 converts the information symbols into signal waveforms that are suitable for the transmission over the telemetry channel 311. In the present disclosure, the telemetry channel comprises the annulus in the borehole between the drilling tubular and the borehole wall. The components 301, 303, 305, 307 and 309 are all downhole. At the surface, the demodulator 313 coverts the received signal into information symbols. This process typically involves many operations such as synchronization, timing, matched filtering and detection. The channel decoder 315 exploits the intended redundancy to detect or correct any introduced errors. The encryption decoder 317 removes any encryption. The source decoder 319 recovers the compressed source data. The sink 321 is the ultimate destination of the source data. As noted above, for the MPT applications, the encryption encoder and encryption decoder are typically not necessary.

The present disclosure is directed towards channel coding and modulation schemes that can increase the data rate and decrease the error rate simultaneously for the mud pulse telemetry (MPT) system. Prior art MPT systems typically uses binary digital modulation schemes, such as binary frequency shift keying (FSK) and phase shift keying (PS K), and do not apply any channel coding to reduce the error rate. In FSK, the transmitted signal is switched between two frequencies in accordance with the message signal. In PSK, the phase of the transmitted signal is changed in accordance with the message signal. To increase the data rate, the number of modulation signals may be increased, e.g., from 2 (binary) to 4 (quadrature), at the cost of increase of error rate. To decrease the error rate, redundancy may be introduced by applying the channel coding at the cost of reduction of data rate. To increase the data rate without increase of the error rate, a channel code may be designed that has a sufficient coding gain to overcome the penalty from the increase of the number of modulation signals. Such a channel code could be a convolution code with large memory length or a block code with large block length, when channel codes and modulation are designed separately. As a result, the coding system could be complex and computationally expensive. As an alternative, jointly designing channel codes and modulation allows using relative simple channel codes to achieve the same goal. This joint channel coding and modulation scheme is known as the trellis coded modulation (TCM).

First, selection of a data rate and carrier frequency is done. One of the constraints from an MPT system is that the maximum possibly generated frequency is around 40 Hz. This implies that the possible carrier frequency for PSK and FSK can only range from 0 to 40 Hz. With the bandwidth requirements for PSK and FSK signals, appropriate carrier frequencies are selected for various data rates.

The symbol rate is defined as $R_s=R_b/k$, where $R_b$ is the data rate and $k=\log_2 M$. M is the number of symbols. When a rectangular signal pulse is used to represent a digital bit, then the bandwidth of PSK signal is approximately equal to $2 R_s$, centered with the carrier frequency $f_c$. Therefore, the bandwidth of PSK signal decreases linearly with k. Given the data rate $R_b$, the bandwidth is reduced by half, or given the bandwidth, the data rate $R_b$ is doubled from binary PSK (BPSK) to quaternary PSK (QPSK), i.e., from M=2 to M=4. Based on this relationship between the data rate and the bandwidth, it is possible to establish combinations of the data rate and the carries frequency for PSK signals. The results are summarized in Table I.

TABLE I

Selection of data rate and carrier frequency for PSK signals

| | Data Rate (bps) | 10 | 20 | 30 | 40 | 60 | 80 |
|---|---|---|---|---|---|---|---|
| Symbol rate (bps) | QPSK(M = 4, k = 2) | 5 | 10 | 15 | 20 | 30 | 40 |
| | BPSK(M = 2, k = 1) | 10 | 20 | 30 | 40 | 60 | 80 |
| Bandwidth (Hz) | QPSK(M = 4, k = 2) | 10 | 20 | 30 | 40 | 60 | 80 |
| | BPSK(M = 4, k = 2) | 20 | 40 | 60 | 80 | 120 | 160 |
| Carrier frequency (Hz) | QPSK(M = 4, k = 2) | [5, 40] | [10, 40] | [15, 40] | [20, 40] | [30, 40] | 40 |
| | BPSK(M = 4, k = 2) | [10, 40] | [20, 40] | [30, 40] | 40 | / | / |

For example, when carrier frequency $f_c=40$ Hz, the maximum bandwidth is 80 Hz, spanning over 0 and 80 Hz. Thus, for BPSK signals the maximum data rate is $R_b=R_s=40$ bit-per-second (bps), and for QPSK signals the maximum data rate is $R_b=2R_s=80$ bps. When $f_c=10$ Hz, the maximum bandwidth is 20 Hz, spanning over 0 and 20 Hz. Thus, the maximum data rates are 10 and 20 bps for BPSK and QPSK signals, respectively. There is only one choice of carrier frequency (i.e., 40 Hz) for the highest data rate (40 and 80 bps for BPSK and QPSK signals, respectively), but there are more choices of carrier frequency for lower data rates. For example, when the data rate $R_b=10$ bps, the carrier frequency $f_c$ can be any value between 5 and 40 Hz for QPSK signals or between 10 and 40 Hz for BPSK signals.

For FSK signals, the situation is more complicated. The bandwidth is determined by both the multiple carrier frequencies and the separation distances between the carrier frequencies. It is known that for the non-coherent demodulation of orthogonal FSK signals, the minimum frequency separation is $\Delta f=1/T_s$, where the relationship for $T_s=1/R_s$ is the symbol interval. Based on this requirement and the bandwidth established in the above PSK case, possible combinations of the data rate and the carries frequency for FSK signal may be established. The results are summarized in Table II.

TABLE II

Selection of data rate and carrier frequency for non-coherent demodulation of orthogonal FSK signals

| | | | 4 | 10 | 16 | 20 |
|---|---|---|---|---|---|---|
| | Data Rate (bps) | | | | | |
| Symbol rate (bps) | QFSK (M = 4, k = 2) | | 2 | 5 | 8 | 10 |
| | BFSK (M = 2, k = 1) | | 4 | 10 | 16 | 20 |
| Min Freq. Separation (Hz) | QFSK (M = 4, k = 2) | | 2 | 5 | 8 | 10 |
| | BFSK (M = 2, k = 1) | | 4 | 10 | 16 | 20 |
| Carrier Frequency | QFSK (M = 4, k = 2) | $f_1$ | [2, 34] | [5, 25] | [8, 16] | 10 |
| | | $f_2$ | [4, 36] | [10, 30] | [16, 24] | 20 |
| | | $f_3$ | [6, 38] | [15, 35] | [24, 32] | 30 |
| | | $f_4$ | [8, 40] | [20, 40] | [32, 40] | 40 |
| | BFSK (M = 2, k = 1) | $f_1$ | [4, 36] | [10, 30] | [16, 24] | 20 |
| | | $f_2$ | [8, 40] | [20, 40] | [32, 40] | 40 |

For example, when data rate $R_b=20$ bps, the required minimum frequency separation for BFSK signals is $\Delta f=R_s=R_b=20$ Hz. Also, with the bandwidth constraint, the lower one in the two carrier frequencies must be at least 20 Hz. Therefore, the only choices for the two carrier frequencies are 20 Hz and 40 Hz. For QFSK signals, $\Delta f=R_s=R_b/2=10$ Hz and the lowest one in the four carrier frequencies must be at least 10 Hz. This also presents the four carrier frequencies is $[f_{c1}, f_{c2}, f_{c3}, f_{c4}]=[10,20,30,40]$ Hz. Similar to the PSK case, there are more choices of carrier frequency for lower data rates. For example, when data rate $R_b=10$ bps, for QFSK signals the four carrier frequencies can be any value between 5 and 25 Hz, 10 and 30 Hz, 15 and 35 Hz, and 20 and 40 Hz, respectively. Note that with higher data rates than 20 bps, it is not possible to yield an appropriate combination of carrier frequencies to satisfy all these requirements on bandwidth, frequency separation and carrier frequency. Therefore, with the use of the non-coherent demodulation of orthogonal FSK signals, an MPT system can achieve a maximum data rate of 20 bps, using either BFSK or QFSK scheme.

Two commonly used criteria for measuring the performance of modulation schemes are bandwidth efficiency and energy efficiency. The bandwidth efficiency, $\beta_s$, is the normalized data rate, defined as the ratio of data rate $R_b$ to signal bandwidth $W_s$, $$\beta_s = R_b/W_s \qquad (1).$$

The unit of $\beta_s$ is bits per second per Hz, i.e., bps/Hz. The energy efficiency, $\gamma_b$, is the signal-to-noise (SNR) per bit, defined as the ratio of bit energy $E_b$ to noise spectral density $N_0$, i.e., $$\gamma_b = E_b/N_0 \qquad (2)$$

For given $\gamma_b$, the use of channel coding is able to reduce the bit error rate (BER), $P_b$, and vice-versa. In both cases, the data rate is decreased due to the redundancy introduced by the channel coding. To reduce $P_b$ without decreasing the data rate, either the signal bandwidth for power-limited channels should be increased or increase the signal power for band-limited channels.

As an example, consider a modulation system using the QPSK which has a bandwidth efficiency of $\beta_s=2$ bps/Hz. When applying a channel code of rate $R_c=2/3$, the data rate is reduced from $R_b=2$ bps to $R_b=3/2$ bps. To maintain the same data rate, i.e., $R_b=2$ bps, the signal bandwidth $W_s$ could be expanded by a factor of $B_e=1/R_c=3/2$, which is equivalent to reducing the signal duration by a factor of 2/3. The resultant bandwidth efficiency is reduced to $\beta_s=4/3$ bps/Hz.

While this choice of the bandwidth expansion or the bandwidth efficiency reduction is good for power-limited channels, it is not desirable for band-limited channels. As an alternative, the number of modulation signals may be increased from 4 to 8, by using 8 PSK to replace QPSK, which is equivalent to increasing the number of bits per signal duration (or per symbol) from 2 to 3. The resulting bandwidth efficiency is the same as the uncoded QPSK, i.e., $\beta_s=2$ bps/Hz. However, this signal constellation expansion from QPSK to 8-PSK requires 4 dB additional signal power or 4 dB increase of $\gamma_b$ to maintain the same $P_b$. This is because the minimum Euclidean distance between signal points in the 8 PSK signal constellation is less than the distance in the QPSK signal constellation. Thus, the coding gain from the channel code must be sufficient to overcome this 4 dB penalty to maintain the same or even less $P_b$. If channel coding and modulation scheme are designed separately, convolution codes with large memory length or linear block codes with large block length are needed. In either case, the coding and decoding system is complex and computationally expensive. For the purposes of the present disclosure, we adopt the definition given in Wikipedia. A constellation diagram is a representation of a signal modulated by a digital modulation scheme such as quadrature amplitude modulation or phase-shift keying. It displays the signal as a two-dimensional scatter diagram in the complex plane at symbol sampling instants. In a more abstract sense, it represents the possible symbols that may be selected by a given modulation scheme as points in the complex plane. Measured constellation diagrams can be used to recognize the type of interference and distortion in a signal. The term "constellation" is defined as the entire ensemble of signals possible with a particular modulation method.

As an alternative, if channel coding and modulation are designed jointly, relatively simple channel codes can be used. This leads to the design scheme known as TCM. As noted in *Ungerboeck* (1982), Signal waveforms representing information sequences are most impervious to noise-induced detection errors if they are very different from each other. Mathematically, this translates into the requirement that signal sequences should have large distance in Euclidean signal space. The essential new concept of TCM that led to the aforementioned gains was to use signal-set expansion to provide redundancy for coding, and to design coding and signal-mapping functions jointly so as to maximize directly the "free distance" (minimum Euclidean distance) between coded signal sequences. This allowed the construction of modulation codes whose free distance significantly exceeded the minimum distance between uncoded modulation signals, at the same information rate, bandwidth, and signal power. The term "trellis" is used because these schemes can be described by a state-transition (trellis) diagram similar to the trellis diagrams of binary convolutional codes. The difference is that in TCM schemes, the trellis branches are labeled with redundant nonbinary modulation signals rather than with binary code symbols.

A core concept of the TCM is the set partitioning of the signal constellation (Ungerboeck, 1982), which involves successively dividing the constellation into smaller subsets with the maximally increasing minimum Euclidean distance between signal points in a subset. Mapping coded information bits to these set-partitioned signals forms a joint design of coding and modulation.

Figure 4:
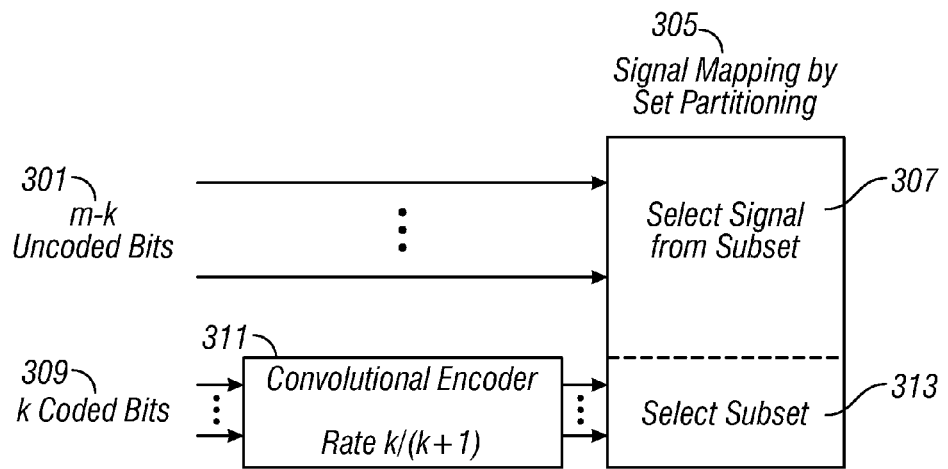
FIG. 4 shows a block diagram of the TCM encoding process showing the convolutional coding and set partitioning.

The design of TCM can be interpreted in terms of the convolutional coding with the set partitioning of signal constellations. This is illustrated in FIG. 4. Given a block of m information bits input to the TCM, k≦m bits 309 are input to a rate k/(k+1) convolutional encoder 311 and its outputs are used to select one of 2k+1 set-partitioning subsets of a redundant signal constellation with 2m+1 signal points. The uncoded (m−k) bits 301 are used to select one of 2m−k signal points in the subset to be transmitted. Using the same previous example, given a data rate $R_b=2$ bps and code rate $R_c=2/3$, for m=2 information bits we may input k=1 bit to a rate 1/2 convolutional encoder. The output 2 bits are used to select one of 4 subsets in the second level 313 of set partitioning 305 of 8PSK signal constellation. The uncoded 1 bit is used to select one of 2 signal points in the subset 307.

Alternatively, values of k=m=2 bit may be input to a rate 2/3 convolutional encoder 311. The output 3 bits are used to select one of 8 subsets in the third level of set partitioning of 8PSK signal constellation, where there is only one signal point in each subset. Trellis diagrams can be used to conveniently represent convolution codes and thus TCM codes, which is also the reason for its name. The difference between the trellis representations for convolution and TCM codes is that the trellis branches in the TCM are labeled with modulation signal subsets, rather than with code words as in the convolution code. In general, two rules are applied to assign the set-partitioned subsets of signal constellation to the state transitions in the TCM trellis (Ungerboeck, 1982): (1) signal subsets should be used with equal frequency and with a fair amount of regularity and symmetry; and (2) Transitions originating from the same state or merging into the same state, and parallel transitions receive signal subsets separated by the largest Euclidean distance.

The Viterbi algorithm (Viterbi, 1967) may be used for an optimum decoding of TCM codes in the sense of maximum likelihood sequence estimator. As the Euclidean distance is used to determine the optimum trellis transition in the TCM, the Viterbi algorithm is called soft-decision decoding (Moon, 2005), where the decoding is directly applied to channel outputs. The bandwidth efficiency $\beta_s$ mainly depends on the basic waveforms of data shaping pulses and the utilization of all available signal space dimensions. For signals that are limited in time to an interval τ and in frequency to a bandwidth ω, the number of signal space dimensions is 2τω (Saha and Birdsall, 1989). In the case of PSK signals, τ=Ts and ω=2Ws=2/Ts, where Ts is the signal duration, thus the signal space dimension is 2τω=4. In the conventional TCM as discussed above, only 2 of the available 4 dimensions are utilized, because the PSK signal constellations are defined in a 2-dimensional signal space with the phase separation of 2π/M, where M is the number of signal points in the signal constellation. Thus, there exists the possibility to exploit the other 2 dimensions for designing more efficient modulation schemes. $Q^2PSK$ is such a design that utilizes all available 4 dimensions to build the signal constellation. As a result, the bandwidth efficiency $\beta_s$ is increased by a factor of 2 as compared to using QPSK, without substantially increasing the energy efficiency $\gamma_b$. Actually the increase of $\gamma_b$ is about 1.2 dB from QPSK to $Q^2PSK$ (Saha, 1990), as compared to 4 dB from QPSK to 8-PSK. Therefore, it can be expected that the TCM using $Q^2PSK$ signals will outperform the TCM using 8-PSK signals.

In $Q^2PSK$ two data shaping pulses and two carriers are used. The pulses and carriers are pairwise quadrature in phase, creating two more dimensions than are used in the QPSK. For a sequence of input signals, $a_i(t)=\pm 1$ for $2jT_b \leq t \leq 2(j+1)T_b$ and i=1, 2, 3, 4, containing 4 information bits, the $Q^2PSK$ modulation signal can be generated as:

$$S_{Q^2PSK}(t) = \sum_{i=1}^{4} a_i(t)b_i(t), \text{ for } 2jT_b \leq 2(j+1)T_b, \quad (3)$$

where j is any integer, $T_b$ is the bit interval for QPSK signals, and $b_i(t)$ are a set of 4 basis modulation signals, defined as $$b_1(t)=p_1(t)\cos(2\pi f_c t+\phi_0), b_2(t)p_2(t)\cos(2\pi f_c t+\phi_0)$$

$$b_3(t)=p_1(t)\sin(2\pi f_c t+\phi_0), b_4(t)p_2(t)\sin(2\pi f_c t+\phi_0) \quad (4),$$

where $f_c$ is the carrier frequency, $\phi_0$ is the initial phase, and $p_1(t)$ and $p_2(t)$ are the data shaping pulses, defined as $$p_1(t)=\cos(\pi t/2Tb)p_2(t)=\sin(\pi t/2T_b) \quad (5).$$

The two data shaping pulses, $p_1(t)$ and $p_2(t)$, and two carriers, $\cos(2\pi f_c t)$ and $\sin(2\pi f_c t)$ are pairwise-quadrature in phase. Thus, this modulation scheme is named quadrature-quadrature PSK. Note that $b_i(t)$ are a set of 4 equal-energy orthogonal signals over any interval of duration $2T_b$ centered at $(2j+1)T_b$, under the constraint of $$fc=1/4T_b, \quad (6)$$

where l≧2 is any integer. Also note that 4 information bits are conveyed in any signal duration $2T_b$, thus the data rate is $2/T_b$. That is, the $Q^2PSK$ signal doubles the bandwidth efficiency $\beta_s$ and the data rate $R_b$ over the QPSK signal. Note that at any time interval of $2T_b$ centered at $(2j+1)T_b$, the $Q^2PSK$ signal appears as one of 16 waveforms composed by cosinusoidal and sinusoidal signals with two distinct frequencies, $fc\pm 1/4T_b$ and two distinct phases, 0 and π. The frequency separation between the two frequencies is $1/2T_b$, which is minimum spacing requirement for coherent orthogonality of two FSK signal of duration $T_b$.

The $Q^2PSK$ modulation signals generated by equation (3) do not maintain a constant envelope, something that is desirable for an MPT system. A simple parity coding can be applied to generate the constant-envelope $Q^2PSK$ (CE-$Q^2PSK$) signal. Given a sequence of input signals, $a_i(t)=\pm 1$ for $2jT_b \leq t \leq 2(j+1)T_b$ and i=~1,2,3, containing 3 information bits, an odd parity-check bit, $a_4(t)$, is generated as, $$a_4(t)=-a_1(t)a_2(t)/a_3(t) \quad (7).$$

Figure 5:
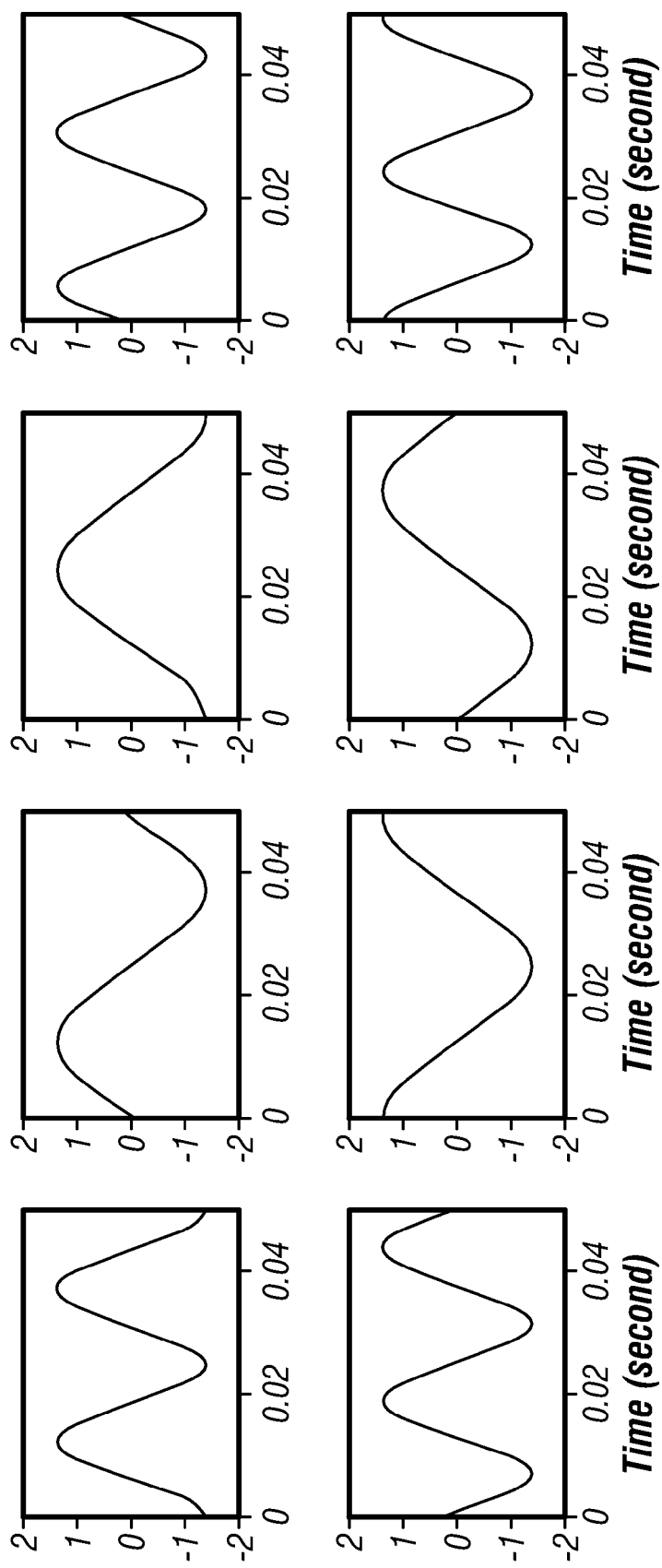
FIG. 5 shows 8 distinct CE-$Q^2$PSK signals, four of which are negatives of the other four.

Substituting this parity coded sequence into equation (3) produces the CE-$Q^2PSK$ signal. While the cost for generating the constant envelope is the decrease of the bandwidth efficiency or data rate by a factor of 3/4 over the uncoded $Q^2PSK$, the redundancy introduced by this parity bit results in a coding gain of 1.8 dB. Since three information bits are input to the CE-$Q^2PSK$, there are a total of eight distinct signal waveforms, among which four waveforms are the negatives of other four. These CE-$Q^2PSK$ signal waveforms are shown in FIG. 5. Note that these waveforms essentially contain two distinct frequencies, $f_1=f_c-1/4T_b$, and $f_2=f_c+1/4T_b$, and four distinct phases separated by π/2.

Figure 6:
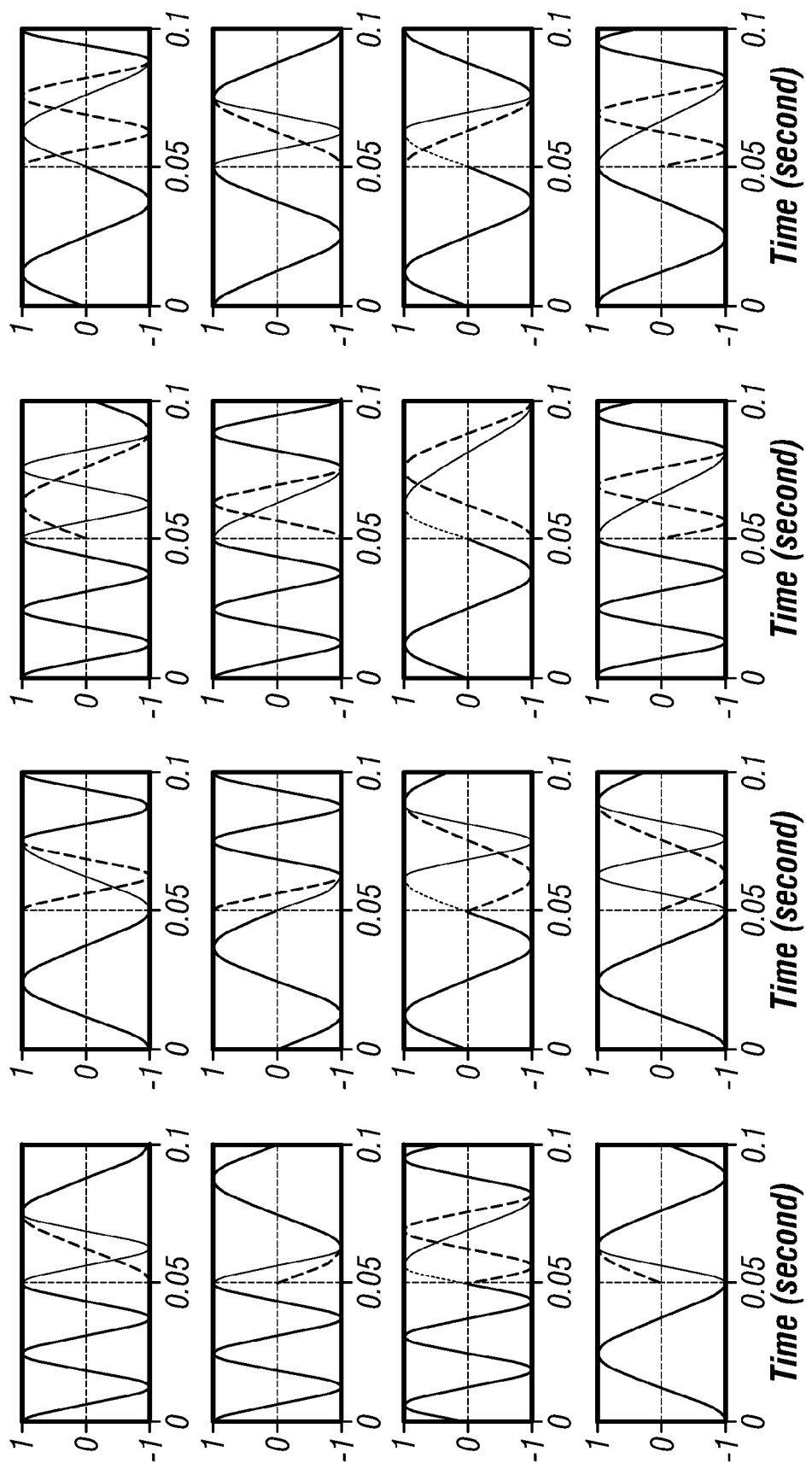
FIG. 6 shows a design of 26 transitional signal waveforms for the CP-CE-$Q^2$PSK signals.
Figure 6:
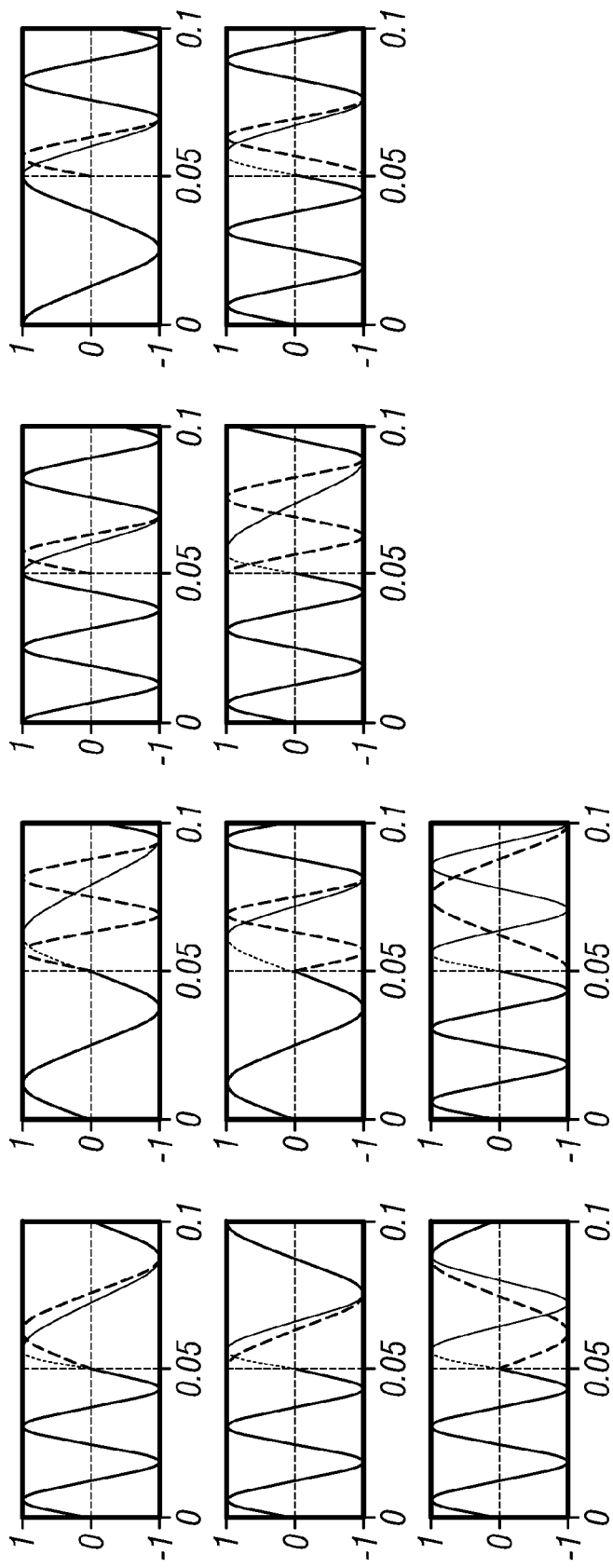

Neither $Q^2PSK$ nor CE-$Q^2PSK$ signals maintain a continuous phase, which is also desirable for an MPT system. Inserting transition signals between any two CE-$Q^2PSK$ signal durations generates the continuous-phase CE-$Q^2PSK$ (CP-CE-$Q^2PSK$) signal. This method is similar to what is used in an existing MPT system, but with more efforts to implement. Note that there are a total of 64 signal transition cases for the eight distinct signal waveforms of CEQ2PSK. Similarly, half of the transition signals are negatives of other half. Among the 32 signal waveforms, 6 waveforms themselves maintain the continuous phases. Thus, only 26 signal waveforms need to be designed. This design is not unique. One design is shown in FIG. 6, where 4 additional frequencies, $$\frac{2}{5}f_2, \frac{2}{3}f_2, \frac{4}{5}f_2 \text{ and } \frac{6}{7}f_2$$

are introduced. In practice, a look-up table can be built for quickly accessing these pre-designed transition signals. Due to the introduction of these frequencies, the CP-CE-$Q^2PSK$ may perform a little bit worse than CEQ2PSK.

Figure 7:
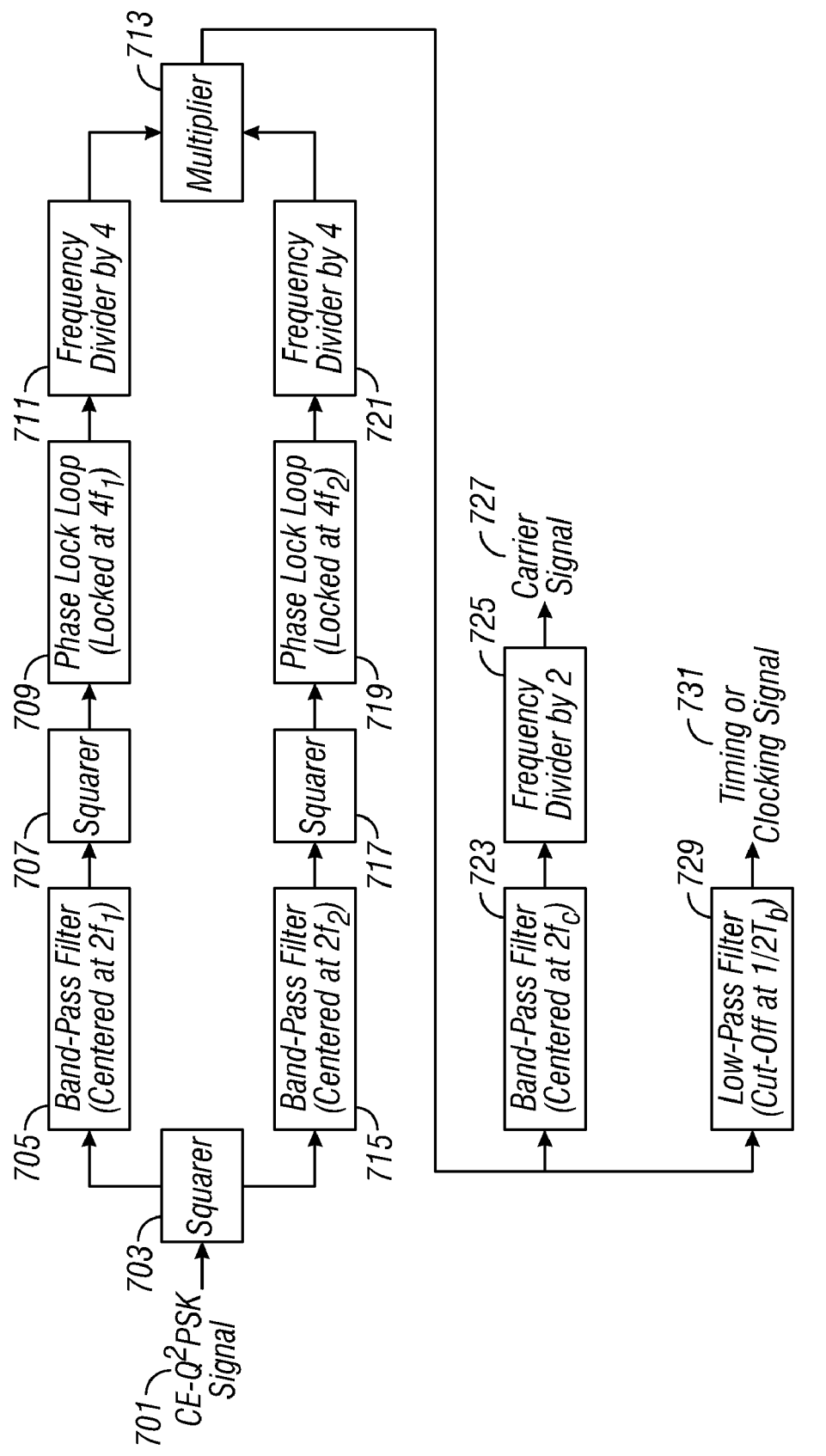
FIG. 7 shows the extraction of carrier phase and bit timing information from the retrieved CE-$Q^2$PSK or CP-CE-$Q^2$PSK signals using a least squares method.

Since $Q^2PSK$ signals use all available dimensions, noncoherent demodulation is not possible. For the coherent or match filter demodulation, the carrier phase and bit timing information is needed. A common method for obtaining this information is to use the squarelaw device or full-wave rectifier (Proakis, 2001). FIG. 7 shows a block diagram of using the square-law method to obtain the carrier phase and bit timing information (Saha and Birdsall, 1989). The CE-$Q^2PSK$ signal 701 is input to a squarer 703. One output of the squarer is bandpassed at a center frequency of $2f_1$ (705), squared again 707, phase locked at $4f_1$ (709), and passed through a frequency divider that reduces its frequency by a factor of 4 711. A second output of the squarer is bandpassed at a center frequency of $2f_2$ (715), squared again 717, phase locked at $4f_2$ (719), and passed through a frequency divider that reduces its frequency by a factor of 4 721. The signals of the frequency dividers 711 and 713 are multiplied 713. The output of the multiplier is bandpass filtered at a center frequency of $2f_c$ 723, has its frequency divided by 2 725 to give the carrier signal. The output of the multiplier is low pass filtered with a cutoff frequency of $1/2 T_b$ 729 to give the timing or clock signal 731.

Figure 8:
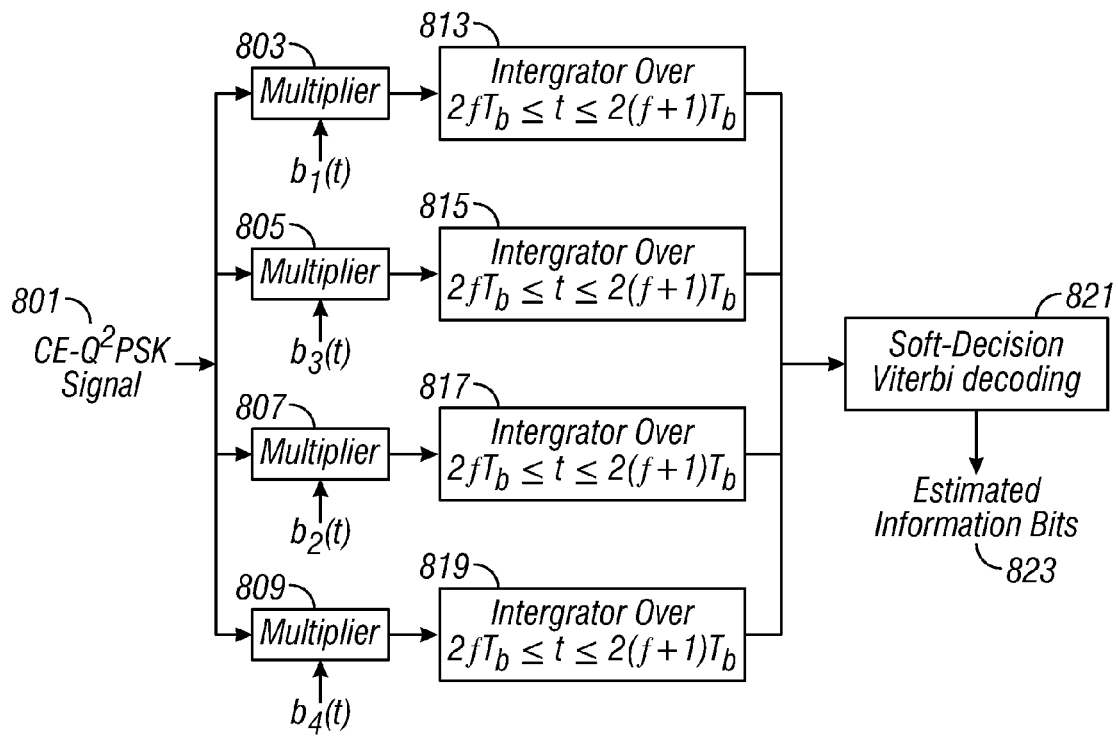
FIG. 8 illustrates coherent demodulation of CE-$Q^2$PSK or CP-CE-$Q^2$PSK signals with the soft-decision Viterbi decoding algorithm.

FIG. 8 shows a block diagram of the coherent demodulation of CE-$Q^2PSK$ or CP-CE-$Q^2PSK$ signals with the soft-decision Viterbi decoding. In general, the soft-decision Viterbi decoding for the TCM is accomplished in two steps: (1) subset decoding—determine the signal closest to the received channel output within each signal subsets assigned to parallel transitions and store these signals and corresponding Euclidean distances; and (2) soft-decision Viterbi decoding—search for the trellis transition with the minimum sum of Euclidean distances from the sequence of the received noisy channel outputs, in which only subset decoded signals are accounted (Ungerboeck, 1987). The CE-$Q^2$PSK or CP-CE-$Q^2$PSK signal 801 is multiplied with the signals $b_1(t)$, $b_3(t)$, $b_2(t)$ and $b_4(t)$ (803, 805, 807, 809). The outputs of the multipliers are integrated over a time window from $2jT_b$ to $2(j+1)T_b$ (813, 815, 817, 819). A soft decision Viterbi decoding 821 gives the estimated information bits.

In the 4-dimensional $Q^2$PSK signal constellation, the 16 signal points can be divided into two groups with each being a set of 8 bi-orthogonal signals. The first group has the fourth information bit as the even-parity check of the first three information bits, while the second group has the fourth information bit as the odd-parity check of the first three information bits. In each group, 4 signals are orthogonal to one another and also the negative of the other four. Denoting the 16 signal points as D0, D1, ..., D15, corresponding to the decimal representations of the 4 information bits, we may group them into 8 pairs, namely P1=[D0, D15], P2=[D5, D10], P3=[D3, D12], P4=[D6, D9], Q1=[D1, D14], Q2=[D2, D13], Q3=[D4, D11], and Q4=[D8, D7]. In each pair, two signal points are antipodal and thus achieve maximum possible Euclidean distance. Using the mapping rules defined in the conventional TCM, these 8 pairs of signal points or code words can be assigned to an 8-state trellis. As a result, an 8-state TCM using Q2PSK can be formed.

Figure 9:
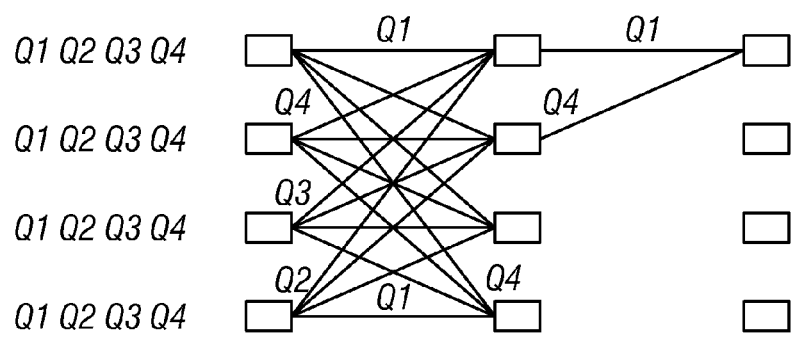
FIG. 9 shows trellis state transitions of the TCM using CE-$Q^2$PSK with 4 states and code rate 3/4.

Similarly, when using the CE-$Q^2$PSK signals and 4 out of 8 pairs of signal points, namely, Q1, Q2, Q3 and Q4, a 4-state TCM can be formed. This 4-state TCM with the CEQ$^2$PSK is shown in FIG. 9. Note that the CE-$Q^2$PSK reduces the bandwidth efficiency $\beta_s$ by a factor of 3/4 over the uncoded $Q^2$PSK while obtaining a coding gain of 1.8 dB. By using the 4-state TCM with the CE-$Q^2$PSK, the coding gain can be significantly increased to 4.8 dB over the uncoded $Q^2$PSK. Compared to the conventional 8-state TCM using 8-PSK, the 4-state TCM using CE-$Q^2$PSK increases the bandwidth efficiency $\beta_s$ or data rate $R_b$ by 50% with the same energy efficiency $\gamma_b$ but with fewer trellis states, which means less computational expense. Compared to the uncoded QPSK, the 4-state TCM using CE-$Q^2$PSK increases the bandwidth efficiency $\beta_s$ or data rate $R_b$ by 50% with less energy efficiency $\gamma_b$.

To summarize, the disclosed TCM scheme uses CE-$Q^2$PSK signals defined in 4-dimensional signal space, which provides improved performance over a conventional TCM. In general, the TCM with CE-$Q^2$PSK is able to increase the data rate by 50% over the prior art TCM with 8-PSK with the same error rate but less computational expense, or by 50% over the uncoded 4-PSK or quadrature PSK with the reduction of error rate. The disclosure of TCM has been with respect to the MPT system, but this is not to be construed as a limitation. The methodology is also suitable for electromagnetic telemetry and wired pipe telemetry.

The operation of the transmitter and receivers may be controlled by the downhole processor and/or the surface processor. The modulation/encoding and demodulation/decoding are done by the downhole processor and the surface processor respectively. Implicit in the control and processing of the data is the use of a computer program on a suitable machine readable medium that enables the processor to perform the control and processing. The machine readable medium may include ROMs, EPROMs, EAROMs, Flash Memories and Optical disks. The results of the processing include telemetry signal estimates relating to measurements made by downhole formation evaluation sensors. Such results are commonly stored on a suitable medium and may be used for further actions in reservoir development such as the completion of wells and the drilling of additional wells.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure.

What is claimed is:

1. A method of communicating a message signal in a wellbore between a downhole location and a surface location, the method comprising:
    acquiring the message signal to be transmitted uphole;
    selecting a data rate and a carrier frequency of a signal used to communicate the message signal;
    jointly encoding and modulating the acquired message signal using an encoding scheme using a set partitioning, to produce an encoded modulated signal;
    using the encoded modulated signal to generate a signal at the downhole location;
    receiving a signal at the surface location responsive to the generated signal; and
    demodulating and decoding the received signal to provide an estimate of the message signal.

2. The method of claim 1 wherein the message signal to be transmitted comprises at least one of: (i) a measurement made by a formation evaluation sensor, and (ii) a measurement of a drilling condition.

3. The method of claim 1 wherein producing an encoded modulated signal further comprises:
    (i) partitioning a set of bits representative of the message signal into a first subset and a second subset;
    (ii) conveying the first subset of the message signal to a convolutional encoder and using the output of the convolutional encoder to define a first subset of the encoded modulated signal; and
    (iii) using the second subset of the message signal to define a second subset of the encoded modulated signal.

4. The method of claim 1 wherein the modulation is selected from the group consisting of: (i) Phase-Shift Keying, (ii) Amplitude Shift keying, and (iii) Frequency Shift Keying.

5. The method of claim 1 wherein the modulation comprises a constant envelope quadrature quadrature phase shift keying.

6. The method of claim 1 wherein the carrier frequency is less than 80 Hz.

7. The method of claim 1 wherein demodulating and decoding the received signal further comprises a coherent demodulation.

8. The method of claim 5 wherein the demodulation further comprises (i) a subset decoding which identifies a signal from a signal constellation closest to the received signal, and (ii) searching for a trellis transition with a minimum sum of Euclidean distances.

9. The method of claim 1 wherein the generated signal comprises a pressure variation in a mud column between the downhole location and the surface location.

10. A system for communicating a message signal in a wellbore between a downhole location and a surface location, the system comprising:
    a sensor configured to acquire data forming the message signal to be transmitted uphole;
    at least one downhole processor configured to use a selected data rate and a selected carrier frequency of a carrier signal to jointly encode and modulate the message signal using an encoding scheme including a set partitioning, to produce an encoded modulated signal;

a signal generator configured to generate a signal at the downhole location responsive to the encoded modulation signal;

a receiver at the surface location configured to produce an output signal responsive to the generated signal; and at least one surface processor configured to demodulate and decode the output signal of the receiver to provide an estimate of the message signal.

11. The system of claim 10 wherein the sensor is selected from the group consisting of: (i) a formation evaluation sensor, and (ii) a sensor responsive to a drilling condition.

12. The system of claim 10 wherein the at least one downhole processor is further configured to produce the encoded modulated signal by further:

(i) partitioning a set of bits representative of the message signal into a first subset and a second subset;

(ii) conveying the first subset of the message signal to a convolutional encoder and using the output of the convolutional encoder to define a first subset of the encoded modulated signal; and (iii) using the second subset of the message signal to define a second subset of the encoded modulated signal.

13. The system of claim 10 wherein the modulation is selected from the group consisting of: (i) Phase-Shift Keying, (ii) Amplitude Shift keying, and (iii) Frequency Shift Keying.

14. The system of claim 10 wherein the modulation comprises a constant envelope quadrature quadrature phase shift keying.

15. The system of claim 10 wherein the carrier frequency is less than 80 Hz.

16. The system of claim 10 wherein the at least one surface processor is further configured to demodulate and decode the received signal by further performing a coherent demodulation.

17. The system of claim 14 wherein the at least one surface processor is further configured to perform the demodulation by performing (i) a subset decoding which identifies a signal from a signal constellation closest to the received signal, and (ii) searching for a trellis transition with a minimum sum of Euclidean distances.

18. The system of claim 10 wherein the signal generator further comprises an oscillating shear valve, the generated signal comprises a pressure variation in a mud column between the downhole location and the surface location, and wherein the receiver at the surface further comprises a pressure sensor.

19. A non-transitory computer-readable medium product accessible to at least one processor, the computer readable medium comprising instructions which enable the at least one processor to demodulate and decode an output signal from a surface receiver responsive to a generated signal downhole, wherein the generated signal comprises a carrier signal jointly encoded and modulated using a set partitioning of a message signal based on data acquired by a downhole sensor.

20. The non-transitory computer-readable medium product of claim 19 further comprising at least one of: (i) a ROM, (ii) an EPROM, (iii) an EAROM, (iv) a flash memory, and (v) an optical disk.

21. The non-transitory computer-readable medium product of claim 19 wherein modulation comprises a constant envelope quadrature quadrature phase shift keying.

* * * * *